Dec. 18, 1962 R. W. PFAFF 3,069,618
LIMIT CIRCUIT

Filed Aug. 19, 1959 2 Sheets-Sheet 1

INVENTOR.
ROBERT W. PFAFF
BY Woodling and Krost,
atty.

INVENTOR.
ROBERT W. PFAFF

United States Patent Office 3,069,618
Patented Dec. 18, 1962

3,069,618
LIMIT CIRCUIT
Robert W. Pfaff, Cleveland, Ohio, assignor to The Reliance Electric & Engineering Company, a corporation of Ohio
Filed Aug. 19, 1959, Ser. No. 834,852
17 Claims. (Cl. 323—22)

The invention relates in general to electrical limit circuits and more particularly to electrical systems, wherein a limit circuit, such as a current limit circuit is provided to take over control of energization means for a load whenever an electrical condition, such as current, becomes excessive.

Electrical systems have been used wherein current limit circuits have been provided, but, in the past, many of these circuits have been dependent upon electron tube devices with the necessary limitation on life of such electron tubes which is unsatisfactory for commercial uses. Also, in many electrical circuits energizing a load from a voltage source, the energization means may be a rectifier supplying a direct current load from an alternating current source and, in such case, ordinarily only a single polarity of the load is possible. Also in other forms of direct current loads, the load is capable of a single polarity, but one which can have a counter electromotive force, which under some conditions can cause current to flow in the opposite direction. In such cases, limitation of an electrical condition such as current, has been very difficult.

Accordingly, an object of the present invention is to provide a current limit circuit which may be used on a rectifier to limit current of either positive or negative polarities.

Still another object of the invention is to provide a limit circuit which may take over control from another control circuit normally controlling energization means for a load.

Still another object of the invention is to provide a current limit circuit to limit the magnitude of current in either of two directions and as determined by a condition of the load.

Still another object of the invention is to provide a limit circuit utilizing transistors to minimize heating and maintenance problems.

Still another object of the invention is to provide a current limit circuit utilizing transistors of opposite types so that the transistors are alternatively conductive for positive and negative load currents.

Other objects and a fuller understanding of this invention may be had by referring to the following description and claims, taken in conjunction with the accompanying drawings, in which:

Figure 1:
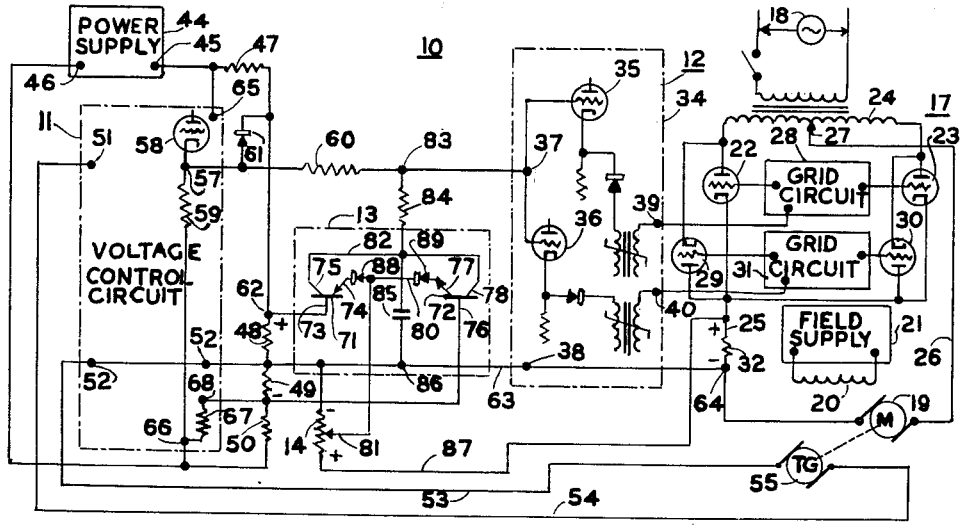
FIGURE 1 is a schematic diagram of the preferred embodiment of the invention.

FIGURE 1 shows a schematic diagram of an electrical system 10, which includes generally a voltage control circuit 11 normally controlling a controlled circuit 12 and subject to overriding control by a limit circuit 13, which has an input from a control voltage source 14. The controlled circuit 12 in the embodiment shown in FIGURE 1 includes a rectifier circuit 17 energized from an alternating current source 18 and supplying rectified energy to a direct current load 19 which has been shown as a motor armature. This motor may have a field 20 energized from a separate supply source 21. The rectifier circuit 17 is representative of many forms of rectifier circuits usable with this invention and is shown as including electric tubes or valves 22 and 23 with the anodes thereof connected to ends of a transformer secondary 24 and with the cathodes connected to a line 25, which is a positive line when the tubes 22 and 23 are conducting, and a line 26 is the negative line at this time and is connected to a center tap 27 of the transformer secondary 24. A grid circuit 28 may control these tubes 22 and 23.

The rectifier circuit 17 also includes another pair of tubes 29 and 30 having their cathodes connected to the ends of the secondary 24 and their anodes connected to the line 25 to make this line negative relative to line 26 upon conduction of tubes 29 and 30. A grid circuit 31 may control these tubes 29 and 30. A current feedback resistor 32 may be connected in the line 25 in series with the load 19.

The controlled circuit 12 also includes a grid control circuit 34 of which only a part thereof is shown to illustrate electronic tubes 35 and 36. This grid control circuit 34 has first and second control terminals 37 and 38 and is constructed and arranged that when the first control terminal 37 is positive, the tube 35 controls the output at a first output terminal 39 to control the grid circuit 28, in turn controlling tubes 22 and 23 to energize the load 19 in a first polarity, which is positive on line 25. When the first control terminal 37 is negative relative to terminal 38 then the electronic tube 36 controls through a second output terminal 40 the second grid circuit 31 and, in turn, controls the tubes 29 and 30 to make line 26 positive relative to line 25. The grid control circuit 34 may have any number of internal circuit structures to accomplish this function.

A power supply 44 may supply D.C. or operating voltages to the voltage control circuit 11 and to the limit circuit 13. This power supply 44 has an output at terminals 45 and 46 across which are connected resistors 47, 48, 49, and 50. These resistors act as a voltage divider to establish proper operating voltages for the voltage control circuit 11 and the limit circuit 13. The voltage control circuit 11 has first and second input terminals 51 and 52 which are connected by lines 53 and 54 to a tachometer generator 55. The tachometer generator 55 is driven from the armature 19 and the voltage thereof preferably opposes that of a reference voltage source within the voltage control circuit 11. This means that only a small difference voltage, either positive or negative, is used as a control voltage. This voltage control circuit 11, which may be considered as a first control circuit, incorporates means for amplifying this small D.C. input voltage and supplying it at a first output terminal 57, which output is relative to a second output terminal 52, the same as the second input terminal. The voltage control circuit 11 may have a fairly low internal impedance between the first and second output termianls 57 and 52, such as provided by an electronic tube 58 and cathode follower impedance 59. A resistor 60 is one form of a symmetrical impedance which may be used to interconnect the first output terminal 57 of the voltage control circuit 11 and the first control terminal 37 of the grid control circuit 34. A rectifier 61 connects the first output terminal 57 to a terminal 62 at the junction of the resistors 47 and 48. The junction of resistors 48 and 49 is connected to the second terminal 52 which is connected by a common line 63 to the second control terminal 38 and to a terminal 64 of the load 19. The terminals 45 and 46 of the power supply 44 supply D.C. operating voltages to the voltage control circuit 11 at terminals 65 and 66, respectively, and a resistor 67 connects terminal 66 to the control circuit terminal 68, which is connected to the junction of resistors 48 and 49.

The limit circuit 13 in this embodiment of the invention is utilized as a current limit circuit and includes control elements which are shown as first and second transistors 71 and 72. The transistors 71 and 72 are of opposite types and may be complementary symmetry transistors with transistor 71 being of the P type or PNP type and transistor 72 being of the N type or NPN type. The first transistor 71 has base, emitter and collector electrodes 73, 74 and 75, respectively, and the transistor 72 likewise has base, emitter and collector electrodes 76, 77 and 78, respectively. The base 73 is connected to terminal 62 and the base 76 is connected to terminal 68. The emitters 74 and 77 are interconnected through protective diode rectifiers 88 and 89 and by a line 80 which is connected to a potentiometer tap 81 on the potentiometer or control voltage source 14. The protective rectifiers 88 and 89 are optional, if circuit considerations require, to protect the transistors from excessive reverse voltages. The collectors 75 and 78 are connected together by a line 82 and are connected to a first output terminal 83 of the current limit circuit 13 through a resistor 84. The resistor 84 and a capacitor 85 form an antihunt circuit which decreases the sensitivity and the tendency to hunt of the entire electrical system 10. The resistor 84 and capacitor 85 are connected in series between the first output terminal 83 and a second output terminal 86 of the current limit circuit 13. One end of the potentiometer 14 is connected by a line 87 to the line 25 of the armature circuit and the other end of this potentiometer 14 is connected to the common line 63 which interconnects the second terminals 52, 86 and 38 and may be considered a ground or common line.

*Operation*

The electrical system 10 provides control of the motor 19 and electronic reversing of this motor armature by controlled conduction of tubes 22 and 23 or tubes 29 and 30. When the control terminal 37 is positive relative to control terminal 38, the tubes 22 and 23 are conductive, and hence, line 25 is positive relative to line 26, so that the motor armature 19 will run in one direction. When the control terminal 37 is negative relative to terminal 38, tubes 29 and 30 are conductive to make line 26 positive relative to line 25, and hence, the motor armature 19 will run in the opposite direction. Variable amounts of positive and negative polarities on the control terminal 37 establish varying degrees of energization of the motor armature 19. The tachometer generator 55 establishes a feedback voltage in accordance with a condition of the load, in this case speed, and this feedback voltage is applied to the input terminals 51 and 52 of the voltage control circuit 11. This small feedback voltage is amplified in the voltage control circuit 11 and applied through the resistor 60 to the control terminal 37. The voltage control circuit 11 and the grid control circuit 34 form a voltage regulating circuit, governed by the feedback from the tachometer generator 55. With positive polarity on line 25, the armature 19 runs in one direction, and the generator 55 has one polarity, for example, positive. This establishes a positive polarity on control terminal 37 and the grid circuit 34 is of the type which acts through tube 36 to decrease the output of the tubes 22 and 23 when this positive potential increases. When the line 26 is positive, armature 19 runs in the opposite direction, and the generator 55 also has the opposite polarity, for example, negative. This establishes a negative polarity on control terminal 37 and the grid control circuit 34, through tube 36 decreases the output of the tubes 29 and 39 when this negative potential increases. Thus, circuits 11 and 12 act as a voltage regulator circuit for normal operating conditions of the system 10. Thus, this voltage circuit 11 normally controls the load 19 for both positive and negative polarities thereof. Should the current in the load increase to an unsafe value for either the load 19 or the rectifier circuit 17, the limit circuit 13 will become effective to limit the current. This limit circuit 13 will limit both positive and negative polarities of current in the load 19. The resistors 48 and 49 act as a reference voltage source with a positive terminal 62, a negative terminal 68 and an intermediate terminal 52 connected to the common second terminals. Thus, this reference voltage source of resistors 48 and 49 establishes a positive reference voltage on the base 73 and a negative reference voltage on the base 76. The control source 14 obtains a current limit signal from the current feedback resistor 32 which is positive at the potentiometer tap 81 when line 25 is positive relative to line 26. Conversely, when line 26 is positive relative to line 25 the potentiometer tap 81 is negative relative to the common line 63. During normal operation of the system 10, when line 25 is positive relative to line 26, there is a positive polarity of feedback voltage or current limit signal at potentiometer tap 81. Normally, this current limit signal does not exceed the positive reference voltage obtained from resistor 48, and hence, the first transistor 71 is in a non-conducting state. When the current in the load 19 becomes excessive, the voltage drop across the current feedback resistor 32 becomes high enough that the voltage at the potentiometer tap 81 exceeds the reference voltage across the resistor 48. This means that the voltage applied in the emitter-base circuit of the first transistor 71 is such as to establish conduction of the first transistor 71, and hence, collector current is passed out of the collector 75 to the first output terminal 83 of the current limit circuit 13. This current flows to the left, as viewed in FIGURE 1, through the resistor 60 and returns to the common line 63 through the voltage control circuit 11, such as through the resistors 59, 67 and 49. This flow of current through the resistor 60 makes the first control terminal 37 more positive and the grid control circuit 34 is such that making this terminal more positive decreases the output of the tubes 22 and 23. Accordingly, the current in the load 19 is limited to a preset value as determined by the setting of the potentiometer 14.

When the tubes 29 and 30 are conducting to make line 26 positive relative to line 25, the current in the load 19 may be limited to a pre-set value by the transistor 72 in the limit circuit 13. In this case, the potentiometer tap 81 is negative relative to the common line 63 and this negative current limit signal opposes the negative reference voltage from resistor 49 in the emitter-base circuit of transistor 72. When the load current exceeds the preset value, the current limit signal will exceed the reference voltage from resistor 49, causing conduction of the transistor 72, and hence, collector current flows from the first output terminal 83 of the current limit circuit 13 into the collector 78 of the transistor 72. This flow of current is to the right in the resistor 60 to make the first control terminal 37 more negative. This more negative potential controls the tube 36 and the grid circuit 34, so that tubes 29 and 30 have a decreased output to the load 19. Accordingly, the current of this polarity is also limited to a pre-set value.

Figure 2:
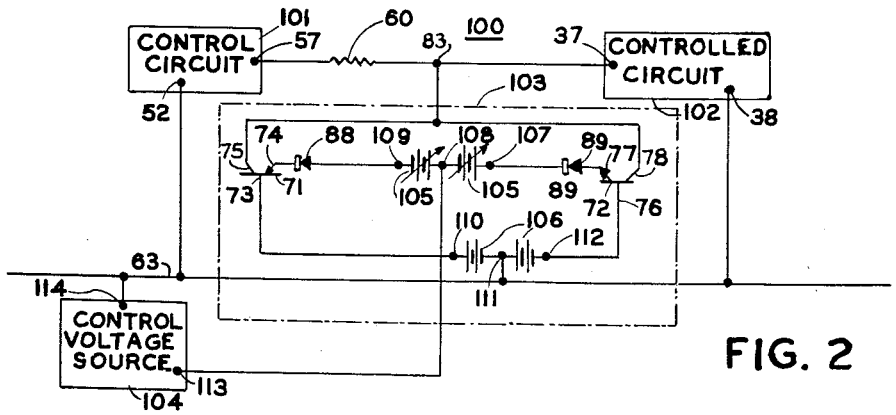
FIGURES 2 to 5 are further schematic diagrams of modifications of the invention.

FIGURE 2 is a modified electrical system 100 which includes a first control circuit 101, a controlled circuit 102, a limit circuit 103 and a control voltage source 104. The first control circuit 101 may be similar to the voltage control circuit 11 of FIGURE 1 and similarly the controlled circuit 102 may be similar to the controlled circuit 12 and the control voltage source 104 may be similar to the control voltage source 14. The limit circuit 103 is similar to the limit circuit 13 of FIGURE 1, but the transistors 71 and 72 are connected in a different circuit arrangement. The diode rectifiers 88 and 89 are again used as protective rectifiers to protect the transistors from harmful reverse voltages and their use again may not be necessary under certain circuit conditions. The transistors 71 and 72 are again connected in a common base circuit arrangement through reference voltage means which includes first and second reference voltage sources 105 and 106. The first reference voltage source 105 has positive, intermediate and negative terminals 107, 108, and 109, respectively, and the second reference voltage source 106 has positive, intermediate and negative terminals 110, 111 and 112. The base 73 is connected to the positive terminal 110 and the base 76 is connected to the negative terminal 112. The intermediate terminal 111 is connected to the common line 63. The emitter 77 is connected to conduct current through the protective diode rectifier 89 to the positive terminal 107 and the negative terminal 109 is connected to conduct current through the protective diode rectifier 88 to the emitter 74. The intermediate terminal 108 is connected to a first output terminal 113 of the control voltage source 104. A second output terminal 114 of this control voltage source 104 is connected to the common line 63. The collectors 75 and 78 are interconnected and connected to the limit circuit output terminal 83. This latter connection may be made through an antihunt circuit 84—85, if desired, as in FIGURE 1.

In operation, the system 100 of FIGURE 2 operates in a manner similar to the system of FIGURE 1 in that the first control circuit 101 normally may be in control of the controlled circuit 102 except when positive or negative polarities of the control voltage from the source 104 exceed a pre-set value. The reference voltage source 105 has been shown as being variable and represents one way in which the pre-set condition may be changed.

When terminal 113 becomes positive beyond the pre-set value relative to the common line 63, then this positive potential exceeds the voltage of the reference sources applied to transistor 71, and hence, this transistor conducts. In this circuit of FIGURE 2, the left half of both sources 105 and 106 are in the base-emitter circuit, and hence, the voltage from the control voltage source 104 must exceed the sum of these two reference voltages. After the transistor 71 commences to conduct, the emitter-collector current is provided primarily by the voltage of the control voltage source 104 and is opposed only by that voltage from the left half of the voltage source 105; hence, this means that a larger voltage is available to provide the emitter-collector current through resistor 60 than is available in FIGURE 1. This is an advantage in using two reference voltage sources rather than one as in FIGURE 1. Again, this transistor load current flows through the resistor 60 making terminal 37 more positive, and hence, the controlled circuit 102 is such that it decreases the positive polarity output thereof. This may be a circuit similar to the controlled circuit 12 of FIGURE 1 which decreases the output to the load 19. The control voltage source 104 may derive a voltage in accordance with a condition of the load, the same as in FIGURE 1.

When a negative polarity of voltage from the control voltage source 104 exceeds a pre-set limit then this negative voltage at terminal 113 exceeds the voltages from the right half of the reference voltage sources 105 and 106 to cause conduction in the base-emitter circuit of transistor 72. This turns on the transistor 72 providing collector current into the transistor and making terminal 37 more negative to decrease the negative polarity output of the controlled circuit 102.

Figure 3:
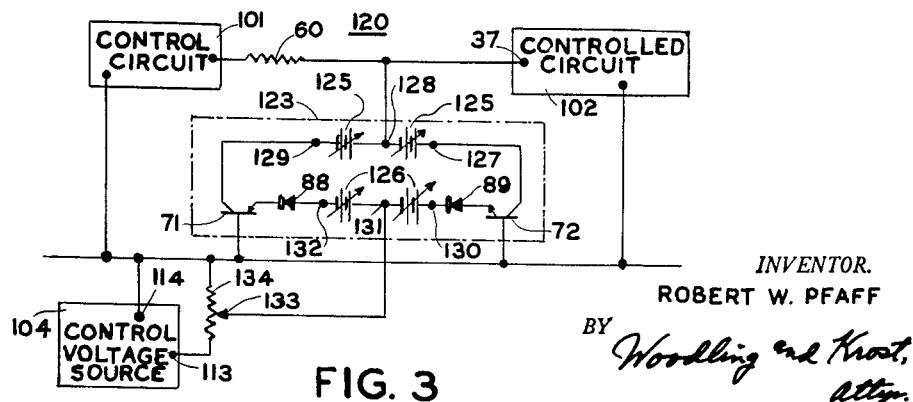

FIGURE 3 is a circuit diagram of another modification of the invention showing an electrical system 120 again incorporating the control circuit 101, the controlled circuit 102 and the control voltage source 104. A limit circuit 123 is provided which includes the transistors 71 and 72, the diodes 88 and 89, and reference voltage sources 125 and 126. The reference voltage source 125 includes positive, intermediate and negative terminals 127, 128 and 129, respectively, and the reference voltage source 126 also includes positive, intermediate and negative terminals 130, 131, and 132, respectively. The intermediate terminal 128 is connected to the control terminal 37 of the controlled circuit 102 and the positive and negative terminals 127 and 129 of this reference voltage source 125 are connected to the collectors of the transistors 72 and 71, respectively. The intermediate terminal 131 is connected to a potentiometer tap 133 of a potentiometer 134 which in turn is connected across the terminals 113 and 114 of the control voltage source 104. The positive terminal 130 is connected through the rectifier 89 to the emitter of the collector 72 and similarly the negative terminal 132 is connected through the rectifier 88 to the emitter of the transistor 71.

The reference voltage sources 125 and 126 have been shown as being variable, and either of these or the potentiometer 134 may be varied to change the pre-set condition at which current limit occurs. The system 120 of FIGURE 3 operates in a manner similar to the circuit of FIGURE 2 in that when the positive limit signal voltage at the potentiometer tap exceeds the bias in the base-emitter circuit from the reference voltage source 126, the transistor 71 conducts and the collector current is aided by the voltage from the reference voltage source 125 to again make the terminal 37 more positive to decrease the positive polarity output from the controlled circuit 102. Conversely, when the terminal 113 becomes too negative, this voltage exceeds the reference voltage source 126 on the transistor 72 to cause it to conduct, and hence, terminal 37 becomes more negative to decrease the negative polarity output of the controlled circuit 102.

Figure 4:
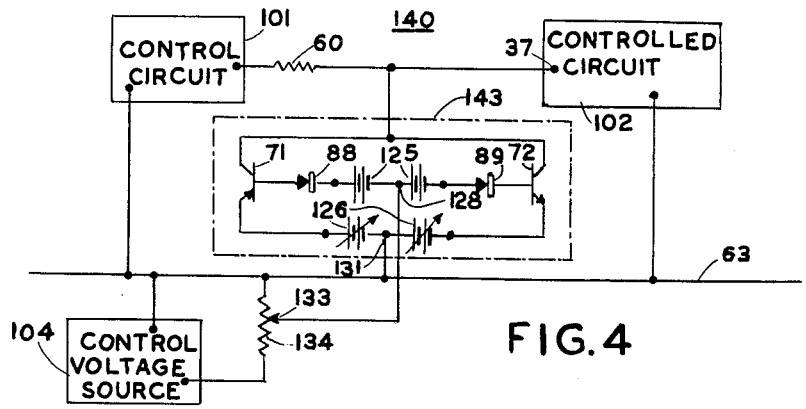

FIGURE 4 shows an electrical system 140 which includes a limit circuit 143 and wherein the transistors 71 and 72 are connected in a common-emitter circuit arrangement rather than the common base circuit arrangements of FIGURES 1 to 3. The protective diode rectifiers 88 and 89 are again used, if desired, in the base-emitter circuits of the transistors 71 and 72 to protect these transistors against too high a reverse voltage. The reference voltage sources 125 and 126 are again used and the reference voltage source 125 applies reference voltages to the bases of the transistors 71 and 72 and the reference voltage source 126 applies reference voltages to the emitters of these transistors. The intermediate terminal 131 of reference voltage source 126 is connected to the common line 63 and the intermediate terminal 128 of the reference source 125 is connected to the potentiometer tap 133. The collectors of transistors 71 and 72 are interconnected and connected to the control terminal 37.

In operation, the circuit of FIGURE 4 is such that when the potentiometer tap 133 becomes more negative than a pre-set value as determined by the voltages of the left half of reference sources 125 and 126, the net result of the voltages in the base-emitter circuit of transistor 71 is negative on the base to cause conduction thereof. This causes collector current flow from transistor 71 to make terminal 37 more positive to decrease the output of the controlled circuit 102. Conversely, when the potentiometer tap 133 becomes more positive than a pre-set value, the net result of the voltages in the base-emitter circuit is positive on the base of the transistor 72 causing conduction thereof, and hence, terminal 37 becomes more negative to decrease the negative polarity output of the controlled circuit 102.

Figure 5:
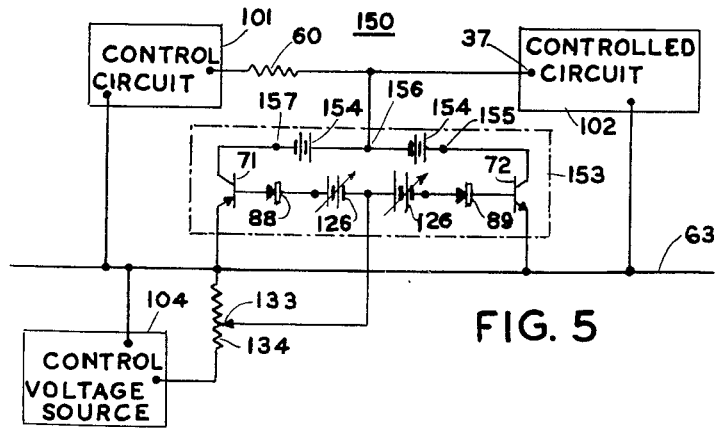

FIGURE 5 is a still further modification showing an electrical system 150 including a limit circuit 153 incorporating the transistors 71 and 72 again in a common emitter circuit arrangement. The emitters of both transistors 71 and 72 are connected directly to the common line 63 and the voltage source 126 is used with the diode rectifiers 88 and 89 applying positive and negative potentials, respectively, to the base electrodes of the transistors 71 and 72. A reference voltage source 154 is included having positive, intermediate and negative terminals 155, 156 and 157, respectively. The positive terminal 155 is connected to the collector of the transistor 72 and the negative terminal 157 is connected to the collector of transistor 71. The intermediate terminal 156 is connected to the control terminal 37 of the controlled circuit 102.

In operation, the potentiometer tap 133 supplies a positive or a negative input signal to the limit circuit 153 and when this potentiometer 133 becomes more negative than a pre-set value, as determined by the reference voltage source 126, the transistor 71 conducts and collector current flows as aided by the reference source 154 through the resistor 60. This makes the terminal 37 more positive to decrease the positive polarity output of the controlled circuit 102. Conversely, when the potentiometer tap 133 becomes more positive than a pre-determined value, the transistor 72 will become conductive to make the terminal 37 more negative, and hence, decrease the negative polarity output of the controlled circuit 102.

Figure 6:
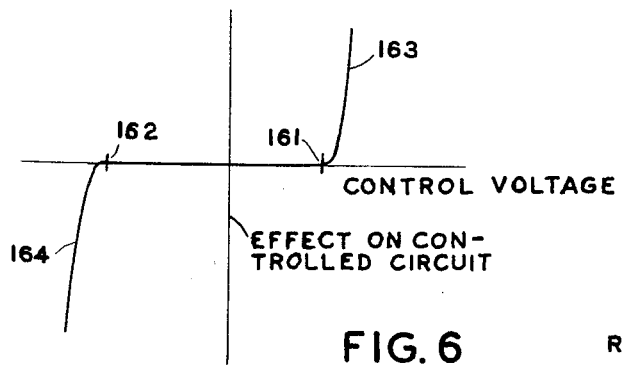
FIGURE 6 is a graph of circuit conditions.

FIGURE 6 is a graph of circuit conditions for all circuits of FIGURES 1 to 5 and points on the abscissa represent the control voltage as applied to the input of the limit circuits 13, 103, 123, 143, or 153. The ordinate of the curve of FIGURE 6 shows the effect on the controlled circuit 12 or 102. It will be noted that as long as the control voltage input remains between certain limits as determined by a point 161 in a positive polarity and a point 162 in a negative polarity, the effect on the controlled circuit 12 or 102 is negligible. As soon as the control voltage to the limit circuit exceeds a pre-set value then this limit circuit takes over control of the controlled circuit from the first control circuit 11 or 101. For positive polarities this results in the portion 163 of the curve and for negative polarities this results in portion 164 of the curve. It will be further noted that the points 161 and 162 need not be equally spaced on each side of the ordinate because the reference voltage sources may be adjusted independently of each other for the positive and negative polarities.

The resistor 60 has been termed a symmetrical impedance, but it is not necessary that this impedance be perfectly symmetrical, it merely is necessary that it conduct current in both directions. When transistor 71 is conducting, current flows to the left in resistor 60, as viewed in the figures, and when transistor 72 is conducting, current flows to the right in resistor 60. If the impedance of this resistor 60 is not equal in both directions, then the same amount of current in opposite directions will establish different potentials on the control terminal 37. This would normally establish the current limit effect at different levels of current in the armature circuit, however, this may be changed by variation of the positive and negative reference voltages applied in the base-emitter circuits of the transistors 71 and 72.

Although this invention has been described in its preferred form with a certain degree of particularity, it is understood that the present disclosure of the preferred form has been made only by way of example and that numerous changes in the details of the circuit and the combination and arrangement of circuit elements may be resorted to without departing from the spirit and the scope of the invention as hereinafter claimed.

What is claimed is:

1. An electrical control system, including, in combination, a load, energization means connecting said load to be energized in positive and negative polarities from a voltage source and having control means, a limit circuit having input and output means, means connecting said limit circuit output means to the control means of said energization means, means applying a limit signal to the input means of said limit circuit in accordance with a first condition, said limit circuit including first and second transistors of opposite types and reference voltage source means, each of said transistors having base, emitter and collector electrodes, means connecting said reference voltage means and a positive limit signal in opposition and in circuit with said first transistor emitter and base electrodes to conduct current therethrough upon a limit signal of positive polarity exceeding a positive reference voltage, means connecting said reference voltage means and a negative limit signal in opposition and in circuit with said second transistor emitter and base electrodes to conduct current therethrough upon a limit signal of negative polarity exceeding a negative reference voltage, and means connecting said transistor collectors to said limit circuit output means, whereby when a positive limit signal exceeds a positive reference voltage applied to said first transistor, said first transistor conducts to pass current to said limit circuit output means to decrease the positive polarity output of said energization means to said load, and whereby when a negative limit signal exceeds a negative reference voltage applied to said second transistor said second transistor conducts to pass current from said limit circuit output means to decrease the negative polarity output of said energization means to said load.

2. An electrical control system, including, in combination, a load, energization means connecting said load to be energized in positive and negative polarities from a voltage source and having control means, a current limit circuit having input and output means, means connecting said current limit circuit output means to the control means of said energization means, means applying a current limit signal to the input means of said current limit circuit in accordance with current in said load, said current limit circuit including first and second transistors of opposite types and reference voltage source means, each of said transistors having base, emitter and collector electrodes, means connecting said reference voltage means and a positive current limit signal in opposition and in circuit with said first transistor emitter and base electrodes to conduct current therethrough upon a current limit signal of positive polarity exceeding a positive reference voltage, means connecting said reference voltage means and a negative current limit signal in opposition and in circuit with said second transistor emitter and base electrodes to conduct current therethrough upon a current limit signal of negative polarity exceeding a negative reference voltage, and means connecting said transistor collectors to said current limit circuit output means, whereby when the current in said load exceeds a given amount in a positive direction said current limit signal exceeds said reference voltage applied to said first transistor to cause said first transistor to conduct and pass current to said current limit circuit output means to decrease the positive polarity output of said energization means to said load, and whereby when said current in said load exceeds a given amount in a negative direction said current limit signal exceeds said reference voltage applied to said second transistor to cause said second transistor to conduct and pass current from said current limit circuit output means to decrease the negative polarity output of said energization means to said load.

3. An electrical control system, including, in combination, a load, a voltage source, energization means connecting said load to be energized in positive and negative polarities from said source and having control means, a current limit circuit having input and output means, means connecting said current limit circuit output means to the control means of said energization means, means applying a current limit signal to the input means of said current limit circuit in accordance with current in said load, said current limit circuit including first and second complementary symmetry transistors, first and second rectifiers and reference voltage source means, said first transistor being a PNP type and said second transistor being an NPN type, each of said transistors having base, emitter and collector electrodes, means connecting said reference voltage means and a positive current limit signal in opposition and in circuit with said first transistor emitter and base electrodes and said first rectifier to conduct current therethrough upon a current limit signal of positive polarity exceeding a positive reference voltage, means connecting said reference voltage means and a negative current limit signal in opposition and in circuit with said second transistor emitter and base electrodes and said second rectifier to conduct current therethrough upon a current limit signal of negative polarity exceeding a negative reference voltage, and means connecting said transistor collectors together and to said current limit circuit output means, whereby when the current in said load exceeds a given amount in a positive direction said current limit signal exceeds said reference voltage applied to said first transistor to cause said first transistor to conduct and pass current to said current limit circuit output means to decrease the positive polarity output of said energization means to said load, and whereby when said current in said load exceeds a given amount in a negative direction said current limit signal exceeds said reference voltage applied to said second transistor to cause said second transistor to conduct and pass current from said current limit circuit output means to decrease the negative polarity output of said energization means to said load.

4. An electrical control system, including, in combination, a load, a voltage source, means connecting said load to be energized in positive and negative polarities from said source and having first and second control terminals, a current limit circuit having first and second input and first and second output terminals, means interconnecting said second terminals of said current limit circuit, means connecting said current limit circuit first output terminal to said energization means first input terminal, means applying a current limit signal to the input terminals of said current limit circuit in accordance with current in said load, said current limit circuit including first and second complementary symmetry transistors, first and second rectifiers and reference voltage source means, said first transistor being a PNP type and said second transistor being an NPN type, each of said transistors having base, emitter and collector electrodes, means connecting said reference voltage means and a positive current limit signal in opposition and in circuit with said first transistor emitter and base electrodes and said first rectifier to conduct current therethrough upon a current limit signal of positive polarity exceeding a positive reference voltage, means connecting said reference voltage means and a negative current limit signal in opposition and in circuit with said second transistor emitter and base electrodes and said second rectifier to conduct current therethrough upon a current limit signal of negative polarity exceeding a negative reference voltage, and means connecting said transistor collectors together and to said current limit circuit first output terminal, whereby when the current in said load exceeds a given amount in a positive direction said current limit signal exceeds said reference voltage applied to said first transistor to cause said first transistor to conduct and pass current to said current limit circuit first output terminal to decrease the positive polarity output of said energization means to said load, and whereby when said current in said load exceeds a given amount in a negative direction said current limit signal exceeds said reference voltage applied to said second transistor to cause said second transistor to conduct and pass current from said current limit circuit first output terminal to decrease the negative polarity output of said energization means to said load.

5. An electrical control system, including, in combination, a load, a voltage source, means connecting said load to be energized in positive and negative polarities from said source and having first and second control terminals, a symmetrical impedance connected to said first terminal of said energization means, a current limit circuit having first and second input and first and second output terminals, said second terminals being common, said current limit circuit first output terminal being connected to the junction of said impedance and said energization means first input terminal, means applying a current limit signal to the input terminals of said current limit circuit in accordance with current in said load, said current limit circuit including first and second complementary symmetry transistors, first and second rectifiers and reference voltage source means, said first transistor being a PNP type and said second transistor being an NPN type, each of said transistors having base, emitter and collector electrodes, means connecting said reference voltage means and a positive current limit signal in opposition and in circuit with said first transistor emitter and base electrodes and said first rectifier to conduct current therethrough upon a current limit signal of positive polarity exceeding a positive reference voltage, means connecting said reference voltage means and a negative current limit signal in opposition and in circuit with said second transistor emitter and base electrodes and said second rectifier to conduct current therethrough upon a current limit signal of negative polarity exceeding a negative reference voltage, and means connecting said transistor collectors together and to said current limit circuit first output terminal, whereby when the current in said load exceeds a given amount in a positive direction said current limit signal exceeds said reference voltage applied to said first transistor to cause said first transistor to conduct and pass current through said impedance to make said energization means first terminal more positive to decrease the positive polarity output of said energization means to said load, and whereby when said current in said load exceeds a given amount in a negative direction said current limit signal exceeds said reference voltage applied to said second transistor to cause said second transistor to conduct and pass current through said impedance to make said energization means first terminal more negative to decrease the negative polarity output of said energization means to said load.

6. An electrical control system, including, in combination, a load, a voltage source, means connecting said load to be energized in positive and negative polarities from said source and having first and second control terminals, a first control circuit having first and second output terminals, a symmetrical impedance interconnecting said first terminals of said first control circuit and said energization means, a feedback circuit connected to supply a feedback signal in accordance with a condition of said load to said first control circuit, the input impedance of said energization means exceeding the output impedance of said first control circuit, a current limit control circuit having first and second input and first and second output terminals, said second terminals being common, said current limit circuit first output terminal being connected to the junction of said impedance and said energization means first input terminal, means applying a current limit signal to the input terminals of said current limit circuit in accordance with current in said load, said current limit circuit including first and second complementary symmetry transistors, first and second rectifiers and reference voltage source means, said first transistor being a PNP type and said second transistor being an NPN type, each of said transistors having base, emitter and collector electrodes, means connecting said reference voltage means and a positive current limit signal in opposition and in circuit with said first transistor emitter and base electrodes and said first rectifier to conduct current therethrough upon a current limit signal of positive polarity exceeding positive reference voltage means, means connecting said reference voltage means and a negative current limit signal in opposition and in circuit with said second transistor emitter and base electrodes and said second rectifier to conduct current therethrough upon a current limit signal of negative polarity exceeding negative reference voltage means, and means connecting said transistor collectors together and to said current limit circuit first output terminal, whereby said first control circuit normally controls said load through said impedance and said energization means until the current in said load exceeds a given amount in a positive direction whereupon said current limit signal exceeds said reference voltage applied to said first transistor to cause said first transistor to conduct and pass current through said impedance to make said energization means first terminal more positive to decrease the positive polarity output of said energization means to said load, and whereby when said current in said load exceeds a given amount in a negative direction said current limit signal exceeds said reference voltage applied to said second transistor to cause said second transistor to conduct and pass current through said impedance to make said energization means first terminal more negative to decrease the negative polarity output of said energization means to said load.

7. An electrical control system, including, in combination, a load, a voltage source, means connecting said load to be energized in positive and negative polarities from said source and having first and second control terminals, a voltage control circuit having first and second output terminals, a symmetrical impedance interconnecting said first terminals of said voltage control circuit and said energization means, a voltage feedback circuit connected to supply a feedback voltage in accordance with a condition of said load to said voltage control circuit, the input impedance of said energization means exceeding the output impedance of said voltage control circuit, a current limit circuit having first and second input and first and second output terminals, said second terminals being common, said current limit circuit first output terminal being connected to the junction of said impedance and said energization means first input terminal, means applying a current limit signal to the input terminals of said current limit circuit in accordance with current in said load, said current limit circuit including first and second complementary symmetry transistors, first and second rectifiers and reference D.C. voltage source means, said first transistor being a PNP type and said second transistor being an NPN type, positive and negative reference voltage means obtainable from said reference voltage source means, each of said transistors having base, emitter and collector electrodes, means connecting said positive reference voltage means and a positive current limit signal in opposition and in circuit with said first transistor emitter and base electrodes and said first rectifier to conduct current therethrough upon a current limit signal of positive polarity exceeding said positive reference voltage means, means connecting said negative reference voltage means and a negative current limit signal in opposition and in circuit with said second transistor emitter and base electrodes and said second rectifier to conduct current therethrough upon a current limit signal of negative polarity exceeding said negative reference voltage means, an antihunt circuit connected across the output terminals of said current limit circuit, and means connecting said transistor collectors together and through said antihunt circuit to said current limit circuit first output terminal, whereby said voltage control circuit normally controls said load through said impedance and said energization means until the current in said load exceeds a given amount in a positive direction whereupon said current limit signal exceeds said reference voltage applied to said first transistor to cause said first transistor to conduct and pass current through said impedance to make said energization means first terminal more positive to decrease the positive polarity output of said energization means to said load, and whereby when said current in said load exceeds a given amount in a negative direction said current limit signal exceeds said reference voltage applied to said second transistor to cause said second transistor to conduct and pass current through said impedance to make said energization means first terminal more negative to decrease the negative polarity output of said energization means to said load.

8. An electrical control system, including, in combination, a load, a voltage source, means connecting said load to be energized in positive and negative polarities from said source and having first and second control terminals, a voltage control circuit having first and second output terminals, a symmetrical impedance interconnecting said first terminals of said voltage control circuit and said energization means, a voltage feedback circuit connected to supply a feedback voltage in accordance with a condition of said load to said voltage control circuit, the input impedance of said energization means exceeding the output impedance of said voltage control circuit, a current limit circuit having first and second input and first and second output terminals, said second terminals being common, said current limit circuit first output terminal being connected to the junction of said impedance and said energization means first control terminal, means applying a current limit signal to the input terminals of said current limit circuit in accordance with current in said load, said current limit circuit including first and second complementary symmetry transistors, first and second rectifiers and first and second reference D.C. voltage sources, said first transistor being a PNP type and said second transistor being an NPN type, positive, negative and intermediate terminals on each said D.C. source, each of said transistors having base, emitter and collector electrodes, said first transistor base electrode being connected to said second reference source positive terminal, said first rectifier being connected to conduct current from said first reference source negative terminal to said first transistor emitter, said intermediate terminal of said first reference source being connected to said current limit circuit first input terminal, said intermediate terminal of said second reference source being connected to said common second terminals, said second rectifier being connected to conduct current from said second transistor emitter to said first reference source positive terminal, said second transistor base electrode being connected to said second reference source negative terminal, an antihunt circuit connected across the output terminals of said current limit circuit, and said transistor collectors being connected together and through said antihunt circuit to said current limit circuit first output terminal, whereby said voltage control circuit normally controls said load through said impedance and said energization means until the current in said load exceeds a given amount in a positive direction whereupon said current limit signal exceeds said reference voltages applied in the emitter-base circuit of said first transistor to cause said first transistor to conduct and pass current through said impedance to make said energization means first terminal more positive to decrease the positive polarity output of said energization means to said load, and whereby when said current in said load exceeds a given amount in a negative direction said current limit signal exceeds said reference voltages applied in the emitter-base circuit of said second transistor to cause said second transistor to conduct and pass current through said impedance to make said energization means first terminal more negative to decrease the negative polarity output of said energization means to said load.

9. An electrical control system, including, in combination, a load, a voltage source, means connecting said load to be energized in positive and negative polarities from said source and having first and second control terminals, a voltage control circuit having first and second output terminals, a symmetrical impedance interconnecting said first terminals of said voltage control circuit and said energization means, a voltage feedback circuit connected to supply a feedback voltage in accordance with a condition of said load to said voltage control circuit, the input impedance of said energization means exceeding the output impedance of said voltage control circuit, a current limit circuit having first and second input and first and second output terminals, said second terminals being common, said current limit circuit first output terminal being connected to the junction of said impedance and said energization means first control terminal, means applying a current limit signal to the input terminals of said current limit circuit in accordance with current in said load, said current limit circuit including first and second complementary symmetry transistors, first and second rectifiers and first and second reference D.C. voltage sources, said first transistor being a PNP type and said second transistor being an NPN type, positive, negative and intermediate terminals on each said D.C. source, each of said transistors having base, emitter and collector electrodes, said first and second transistor electrodes being connected to said common second terminals, said first rectifier being connected to conduct current from the negative terminal of said first reference source to said first transistor emitter, said intermediate terminal of said first reference source being connected to said current limit circuit first input terminal, said intermediate terminal of said second reference source being connected to said current limit circuit first output terminal, said second rectifier being connected to conduct current from said second transistor emitter to the positive terminal of said first reference source, an antihunt circuit connected across the output terminals of said current limit circuit, and first and second said transistor collectors being connected to the negative and positive terminals of said second reference source and through said antihunt circuit to said current limit circuit first output terminal, whereby said voltage control circuit normally controls said load through said impedance and said energization means until the current in said load exceeds a given amount in a positive direction whereupon said current limit signal exceeds said reference voltages applied in the emitter-base circuit of said first transistor to cause said first transistor to conduct and pass current through said impedance to make said energization means first terminal more positive to decrease the positive polarity output of said energization means to said load, and whereby when said current in said load exceeds a given amount in a negative direction said current limit signal exceeds said reference voltages applied in the emitter-base circuit of said second transistor to cause said second transistor to conduct and pass current through said impedance to make said energization means first terminal more negative to decrease the negative polarity output of said energization means to said load.

10. An electrical control system, including, in combination, a load, a voltage source, means connecting said load to be energized in positive and negative polarities from said source and having first and second control terminals, a voltage control circuit having first and second output terminals, a symmetrical impedance interconnecting said first terminals of said voltage control circuit and said energization means, a voltage feedback circuit connected to supply a feedback voltage in accordance with a condition of said load to said voltage control circuit, the input impedance of said energization means exceeding the output impedance of said voltage control circuit, a current limit circuit having first and second input and first and second output terminals, said second terminals being common, said current limit circuit first output terminal being connected to the junction of said impedance and said energization means first control terminal, means applying a current limit signal to the input terminals of said current limit circuit in accordance with current in said load, said current limit circuit including first and second complementary symmetry transistors, first and second rectifiers and first and second reference D.C. voltage sources, said first transistor being a PNP type and said second transistor being an NPN type, positive, negative and intermediate terminals on each said D.C. source, each of said transistors having base, emitter and collector electrodes, said first transistor emitter electrode being connected to said second reference source positive terminal, said first rectifier being connected to conduct current from said first transistor base electrode to the positive terminal of said first reference source, said second rectifier being connected to conduct current from said first reference source negative terminal to said second transistor base electrode, said second transistor emitter being connected to said second reference source negative terminal, said second reference source intermediate terminal being connected to said common second terminals, said first reference source intermediate terminal being connected to said current limit circuit first input terminal, an antihunt circuit connected across the output terminals of said current limit circuit, and said transistor collectors being connected together and through said antihunt circuit to said current limit circuit first output terminals, whereby said voltage control circuit normally controls said load through said impedance and said energization means until the current in said load exceeds a given amount in a positive direction whereupon said current limit signal exceeds said reference voltages applied in the emitter-base circuit of said first transistor to cause said first transistor to conduct and pass current through said impedance to make said energization means first terminal more positive to decrease the positive polarity output of said energization means to said load, and whereby when said current in said load exceeds a given amount in a negative direction said current limit signal exceeds said reference voltages applied in the emitter-base circuit of second transistor to cause said second transistor to conduct and pass current through said impedance to make said energization means first terminal more negative to decrease the negative polarity output of said energization means to said load.

11. An electrical control system, including, in combination, a load, a voltage source, means connecting said load to be energized in positive and negative polarities from said source and having first and second control terminals, a voltage control circuit having first and second output terminals, a symmetrical impedance interconnecting said first terminals of said voltage control circuit and said energization means, a voltage feedback circuit connected to supply a feedback voltage in accordance with a condition of said load to said voltage control circuit, the input impedance of said energization means exceeding the output impedance of said voltage control circuit, a current limit circuit having first and second input and first and second output terminals, said second terminals being common, said current limit circuit first output terminal being connected to the junction of said impedance and said energization means first control terminal, means applying a current limit signal to the input terminals of said current limit circuit in accordance with current in said load, said current limit circuit including first and second complementary symmetry transistors, first and second rectifiers and first and second D.C. voltage sources, said first transistor being a PNP type and said second transistor being an NPN type, positive, negative and intermediate terminals on each said D.C. source, each of said transistors having base, emitter and collector electrodes, said first and second transistor emitter electrodes being connected to said common second terminals, said first rectifier being connected to conduct current from said first transistor base electrode to the positive terminal of said first reference source, said second rectifier being connected to conduct current from the negative terminal of said first reference source to said second transistor base electrode, said first reference source intermediate terminal being connected to said first input terminal of said current limit circuit, said intermediate terminal of said second reference source being connected to said current limit circuit first output terminal, an antihunt circuit connected across the output terminals of said current limit circuit, and said first and second transistor collectors being connected to the negative and positive terminals of said second reference source and through said antihunt circuit to said current limit circuit first output terminal, whereby said voltage control circuit normally controls said load through said impedance and said energization means until the current in said load exceeds a given amount in a positive direction whereupon said current limit signal exceeds said reference voltages applied in the emitter-base circuit of said first transistor to cause said first transistor to conduct and pass current through said impedance to make said energization means first terminal more positive to decrease the positive polarity output of said energization means to said load, and whereby when said current in said load exceeds a given amount in a negative direction said current limit signal exceeds said reference voltages applied in the emitter-base circuit of said second transistor to cause said second transistor to conduct and pass current through said impedance to make said energization means first terminal more negative to decrease the negative polarity output of said energization means to said load.

12. An electrical control system, including, in combination, a load, a voltage source, means connecting said load to be energized in positive and negative polarities from said source and having first and second control terminals, a voltage control circuit having first and second output terminals, a symmetrical impedance interconnecting said first terminals of said voltage control circuit and said energization means, a voltage feedback circuit connected to supply a feedback voltage in accordance with a condition of said load to said voltage control circuit, the input impedance of said energizations means exceeding the output impedance of said voltage control circuit, a current limit circuit having first and second input and first and second output terminals, said second terminals being common, said current limit circuit first output terminal being connected to the junction of said impedance and said energization means first control terminal, means applying a current limit signal to the input terminals of said current limit circuit in accordance with current in said load, said current limit circuit including first and second complementary symmetry transistors, first and second rectifiers and a reference D.C. voltage source, said first transistor being a PNP type and said second transistor being an NPN type, positive, negative and intermediate terminals on said D.C. source, each of said transistors having base, emitter and collector electrodes, said first transistor base electrode being connected to said D.C. source positive terminal, said first rectifier being connected to conduct current from said current limit circuit first input terminal to said first transistor emitter, said second rectifier being connected to conduct current from said second transistor emitter to said current limit circuit first input terminal, said second transistor base electrode being connected to said D.C. source negative terminal, said D.C. source intermediate terminal being connected to said common second terminals, an antihunt circuit connected across the output terminals of said current limit circuit, and said transistor collectors being connected together and through said antihunt circuit to said current limit circuit first output terminal, whereby said voltage control circuit normally controls said load through said impedance and said energization means until the current in said load exceeds a given amount in a positive direction whereupon said current limit signal exceeds said reference voltage applied to the base of said first transistor to cause said first transistor to conduct and pass current through said impedance to make said energization means first terminal more positive to decrease the positive polarity output of said energization means to said load, and whereby when said current in said load exceeds a given amount in a negative direction said current limit signal exceeds said reference voltage applied to the base of said second transistor to cause said second transistor to conduct and pass current through said impedance to make said energization means first terminal more negative to decrease the negative polarity output of said energization means to said load.

13. An electrical circuit, including, in combination, a load, a D.C. source, controllable rectifier means connected to said source and having first and second input control terminals, means connecting said load to be responsive to the output of said rectifier means for energization in positive and negative polarities, a voltage control circuit having first and second output terminals, a resistor interconnecting said first terminals of said voltage control circuit and said controllable rectifier means, a voltage feedback circuit connected to supply a feedback voltage in accordance with a condition of said load to said voltage control circuit, the input impedance of said controllable rectifier means exceeding the output impedance of said voltage control circuit, a current limit circuit having first and second input and first and second output terminals, said second terminals being common, said current limit circuit first output terminal being connected to the junction of said resistor and said controllable rectifier means first input terminal, means connected to said load and passing a current limit signal to the input terminals of said current limit circuit, said current limit circuit including first and second complementary symmetry transistors, first and second rectifiers and a reference D.C. source, said first transistor being a PNP type and said second transistor being an NPN type, positive, negative and intermediate terminals on said D.C. source, each of said transistors having base, emitter and collector electrodes, said first transistor base electrode being connected to said D.C. source positive terminal, said first rectifier being connected to conduct current from said current limit circuit first input terminal to said first transistor emitter, said second rectifier being connected to conduct current from said second transistor emitter to said current limit circuit first input terminal, said second transistor base electrode being connected to said D.C. source negative terminal, said D.C. source intermediate terminal being connected to said common second terminals, an antihunt circuit connected across the output terminals of said current limit circuit, and said transistor collectors being connected together and through said antihunt circuit to said current limit circuit first output terminal, whereby said voltage control circuit normally controls said load through said resistor and said controllable rectifier means until the current in said load exceeds a given amount in a positive direction whereupon said current limit signal exceeds said reference voltage applied to the base of said first transistor to cause and first transistor to conduct and pass current through said resistor to make said controllable rectifier means first input terminal more positive to decrease the positive polarity output of said controllable rectifier means to said load, and whereby when said current in said load exceeds a given amount in a negative direction said current limit signal exceeds said reference voltage applied to the base of said second transistor to cause said second transistor to conduct and pass current through said resistor to make said controllable rectifier first input terminal more negative to decrease the negative polarity output of said controllable rectifier means to said load.

14. A motor control circuit, including, in combination, a motor armature, an A.C. source, controllable rectifier means connected to said source and having first and second input control terminals, means connecting said armature to be responsive to the output of said rectifier means for energization in positive and negative polarities, a voltage control circuit having first and second output terminals, a resistor interconnecting said first terminals of said voltage control circuit and said controllable rectifier means, a voltage feedback circuit connected to supply a feedback voltage in accordance with a condition of said armature to said voltage control circuit, the input impedance of said controllable rectifier means far exceeding the output impedance of said voltage control circuit, a current limit circuit having first and second input and first and second output terminals, said second terminals being common, said current limit circuit first output terminal being connected to the junction of said resistor and said controllable rectifier means first input terminal, a current limit signal source connected to said motor armature and passing a current limit signal to the input terminals of said current limit circuit, said current limit circuit including first and second complementary symmetry transistors, first and second rectifiers and a reference D.C. voltage source, said first transistor being a PNP type and said second transistor being an NPN type, positive, negative and intermediate terminals on said D.C. source, each of said transistors having base, emitter and collector electrodes, said first transistor base electrode being connected to said D.C. source positive terminal, said first rectifier from said second transistor emitter to said current limit circuit first input terminal to said first transistor emitter, said second rectifier being connected to conduct current from said second transistor emitter to said current limit circuit first input terminal, said second transistor base electrode being connected to said D.C. source negative terminal, said D.C. source intermediate terminal being connected to said common second terminals, an antihunt circuit connected across the output terminals of said current limit circuit, and said transistor collectors being connected together and through said antihunt circuit to said current limit circuit first output terminal, whereby said voltage control circuit normally controls said motor armature through said resistor and said controllable rectifier means until the current in said motor armature exceeds a given amount in a positive direction whereupon said current limit signal exceeds said reference voltage applied to the base of said first transistor to cause said first transistor to conduct and pass current through said resistor to make said controllable rectifier means first input terminal more positive to decrease the positive polarity output of said controllable rectifier means to said motor armature, and whereby when said current in said motor armature exceeds a given amount in a negative direction said current limit signal exceeds said reference voltage applied to the base of said second transistor to cause said second transistor to conduct and pass current through said resistor to make said controllable rectifier first input terminal more negative to decrease the negative polarity output of said controllable rectifier means to said motor armature.

15. An electrical control system, including, in combination, a load, energization means connecting said load to be energized from a voltage source and having control means, a limit circuit having input and output means, means connecting said limit circuit output means to the control means of said energization means, means applying a limit signal to the input means of said limit circuit in accordance with a first condition, said limit circuit including first and second semi-conductors and reference voltage source means, each of said semi-conductors having input and output means, means connecting said reference voltage means and a positive limit signal in opposition and in circuit with said first semi-conductor input means to conduct current therethrough upon a limit signal of positive polarity exceeding a positive voltage derived from said reference voltage source means, means connecting said reference voltage means and a negative limit signal in opposition and in circuit with said second semi-conductor input means to conduct current therethrough upon a limit signal of negative polarity exceeding a negative voltage derived from said reference voltage source means, and means connecting said semi-conductor output means to said limit circuit output means to control said energization means.

16. An electrical control system, including, in combination, a load, energization means connecting said load to be energized from a voltage source and having control means, a current limit circuit having input and output means, means connecting said current limit circuit output means to the control means of said energization means, means applying a current limit signal to the input means of said current limit circuit in accordance with current in said load, said current limit circuit including first and second semi-conductors and reference voltage source means, each of said semi-conductors having three terminals including input and output means, means connecting said reference voltage means and a positive current limit signal in opposition and in circuit with said first semi-conductor input means to conduct current therethrough upon a current limit signal of positive polarity exceeding a positive reference voltage, means connecting said reference voltage means and a negative current limit signal in opposition and in circuit with said second semi-conductor input means to conduct current therethrough upon a current limit signal of negative polarity exceeding a negative reference voltage, and means connecting said semi-conductor output means to said current limit circuit output means for control of said energization means.

17. An electrical control system, including, in combination, a load, a voltage source, energization means connecting said load to be energized from said source and having control means, a current limit circuit having input and output means, means connecting said current limit circuit output means to the control means of said energization means, means applying a current limit signal to the input means of said current limit circuit in accordance with current in said load, said current limit circuit including first and second complementary symmetry transistors, first and second rectifiers and reference voltage source means, each of said transistors having base, emitter and collector electrodes, means connecting said reference voltage means and a positive current limit signal in opposition and in circuit with said first transistor emitter and base electrodes and said first rectifier to conduct current therethrough upon a current limit signal of positive polarity exceeding a positive reference voltage, means connecting said reference voltage means and a negative current limit signal in opposition and in circuit with said second transistor emitter and base electrodes and said second rectifier to conduct current therethrough upon a current limit signal of negative polarity exceeding a negative reference voltage, and means connecting said transistor collectors together and to said current limit circuit output means for control of said energization means.

References Cited in the file of this patent

UNITED STATES PATENTS

| | | |
|---|---|---|
| 2,888,632 | Livegey | May 26, 1959 |
| 2,888,633 | Carter | May 26, 1959 |
| 2,889,512 | Ford et al. | June 2, 1959 |
| 2,904,742 | Chase | Sept. 15, 1959 |